US005793586A

United States Patent [19]

Rockot et al.

[11] Patent Number: 5,793,586

[45] Date of Patent: Aug. 11, 1998

[54] HYBRID HIGH DIRECT CURRENT CIRCUIT INTERRUPTER

[75] Inventors: Joseph H. Rockot, N. Huntingdon; Harvey E. Mikesell, McMurray; Kamal N. Jha, Bethel Park, all of Pa.

[73] Assignee: The United States of America as represented by the United States Department of Energy, Washington, D.C.

[21] Appl. No.: 736,752

[22] Filed: Oct. 25, 1996

[51] Int. Cl.$^{6}$ .......... H02H 3/00

[52] U.S. Cl. .......... 361/8; 361/93

[58] Field of Search .......... 361/93, 13, 8, 361/2, 3

[56] References Cited

U.S. PATENT DOCUMENTS

| | | | |
|---|---|---|---|
| 4,438,472 | 3/1984 | Woodworth | 361/13 |
| 4,583,146 | 4/1986 | Howell | 361/13 |
| 4,598,187 | 7/1986 | Howell | 200/147 |
| 4,618,906 | 10/1986 | Paice et al. | 361/5 |
| 4,631,621 | 12/1986 | Howell | 361/13 |
| 4,636,907 | 1/1987 | Howell | 361/13 |
| 4,652,962 | 3/1987 | Howell | 361/3 |
| 4,700,256 | 10/1987 | Howell | 361/13 |
| 4,723,187 | 2/1988 | Howell | 361/13 |
| 4,956,738 | 9/1990 | Defosse et al. | 361/9 |

*Primary Examiner*—Jeffrey A. Gaffin
*Assistant Examiner*—Sally C. Medley
*Attorney, Agent, or Firm*—Virginia B. Caress; William R Moser; Paul A. Gottlieb

[57] ABSTRACT

A device and a method for interrupting very high direct currents (greater than 100,000 amperes) and simultaneously blocking high voltages (greater than 600 volts). The device utilizes a mechanical switch to carry very high currents continuously with low loss and a silicon controlled rectifier (SCR) to bypass the current around the mechanical switch while its contacts are separating. A commutation circuit, connected in parallel with the SCR, turns off the SCR by utilizing a resonant circuit to divert the SCR current after the switch opens.

13 Claims, 4 Drawing Sheets

HYBRID HIGH DIRECT CURRENT CIRCUIT INTERRUPTER

BACKGROUND OF THE INVENTION

This invention relates to electrical switches and more specifically to devices for switching very high direct currents at moderately high voltages.

At the present time, high direct current (dc) switches are available to interrupt direct currents in the range of 100,000 amperes. To accomplish this, one type of switch uses liquid metal wetted contacts to reduce contact burning and erosion. The liquid metal typically used in this type of application is mercury; however, other candidate materials include gallium-indium and gallium-indium-tin. During the interruption of current, the mercury is vaporized and the mercury vapor remains in the contact area limiting the ability of the switch to support voltages higher than 10 volts across the switch contacts until the mercury cools and condenses. This limits the application of the high current switches to very low voltage systems such as those used in plating and chemical processing systems. Another type of switch uses dry contacts in a vacuum but it also is limited to low voltage applications to prevent arcing when the contacts separate.

A thyristor is a bistable semiconductor switch having three or more junctions, used chiefly in power control applications. The silicon controlled rectifier (SCR) is the most common type of thyristor. Recently, the utilization of high power solid state electronic components, including thyristors, in conjunction with mechanical switches has allowed high direct current interruption at higher voltages. For example, a power transistor or a gate-turn-off (GTO) thyristor connected in parallel with a mechanical switch has been used to temporarily bypass the current around the mechanical switch while the switch opens. Then the current is interrupted by turning off the transistor or GTO thyristor after the switch contacts have separated sufficiently to block the voltage.

U.S. Pat. No. 4,438,472 teaches the use of a bipolar transistor, with a capacitor connected from collector to base in a Miller effect configuration, to bypass the mechanical switch. The transistor begins to turn on as soon as the collector to emitter voltage exceeds the base to emitter turn-on voltage ($V_{be}$) of the transistor. However, the transistor turns off slowly at a rate determined by the value of the capacitor and the current gain ($\beta$) of the transistor. This circuit is limited to lower currents because of the maximum current limitations of transistors and because the slow turn-off results in high energy dissipation and high junction temperature in the transistor.

U.S. Pat. No. 4,618,906 teaches the use of a GTO type thyristor to bypass the mechanical switch. This circuit is limited by the maximum current turn off capability of the GTO type thyristor.

Other types of solid state switch bypass devices, such as those taught in U.S. Pat. Nos. 4,631,621, 4,652,962 and 4,723,187, include some form of series impedance in the bypass path. This impedance may result from an inductor, the inductance of a transformer winding, or the parasitic inductance of other series components. In very high current interrupters, even a small inductance can produce large voltages across the switch contacts due to the high rate of change of current (di/dt) in the bypass loop when the switch opens.

U.S. Pat. No. 4,700,256 also teaches the use of a bipolar transistor with a Miller effect capacitor, or a zener diode, but with the addition of a saturable core transformer in the bypass circuit to regeneratively couple emitter current to the base. This circuit has the maximum current limitation of transistors as well as the aforementioned voltages due to the series inductance.

Existing high direct current interrupter switches are limited to currents of 12,000 amperes at 800 volts or approximately 100,000 amperes at 10 volts. The present high voltage dc interrupters which use solid state bypass devices are limited to about 12,000 amperes by the maximum current or power handling capabilities of transistors and GTO thyristors. At currents higher than 30,000 amperes, transistors and GTO thyristors cannot be used and the voltage interrupting capability is limited to approximately 10 volts by vacuum arcing or by ionization of the mercury vapor in the area of the mechanical contacts during current interruption. This invention fills the need for a capability to interrupt the higher currents at high voltages.

SUMMARY OF THE INVENTION

The invention is a current interrupter for interrupting direct currents in excess of 100,000 amperes at system voltages in excess of 600 volts. The interrupter is a hybrid electronic and mechanical device which utilizes low resistance mechanical switch contacts to carry continuous currents in excess of 100,000 amperes, with low power dissipation, and a commutated thyristor, preferably a silicon controlled rectifier (SCR), to bypass those currents while the switch is being opened. A commutation circuit connected in parallel with the SCR turns off the SCR by momentarily diverting the current around the SCR. The use of a commutating circuit provides much higher current interruption capability than a GTO thyristor because the SCR current is reduced to zero during turn-off. Because the SCR does not have to interrupt the high current and simultaneously withstand a high voltage, there is no high instantaneous power dissipation in the SCR during turn-off. The commutating circuit connected in parallel with the SCR adds no series impedance to the bypass loop and thereby minimizes the voltage across the switch contacts when the current transfers to the bypass loop. The commutating circuit includes a resonant circuit for producing a high oscillatory current which is superimposed on the SCR current to reduce the SCR current to zero at turn-off. Note: Unless otherwise indicated, references herein to SCR (or thyristor) current mean the main terminal current, not the gate current.

In operation, just prior to interrupting the current, the SCR is turned on to provide a temporary path for the current while the mechanical switch is being opened. Arcing between the switch contacts as they open is prevented by the small voltage drop across the SCR. Then, after the mechanical switch has opened, a resonant commutation circuit connected in parallel with the SCR provides a high oscillatory current which diverts the load current around the SCR for a time long enough to permit the SCR to turn off. Although the instantaneous power dissipation in the SCR is high while it is conducting, its conduction time is so short that the energy dissipated is acceptably small.

DESCRIPTION OF THE PREFERRED EMBODIMENT

Figure 1:
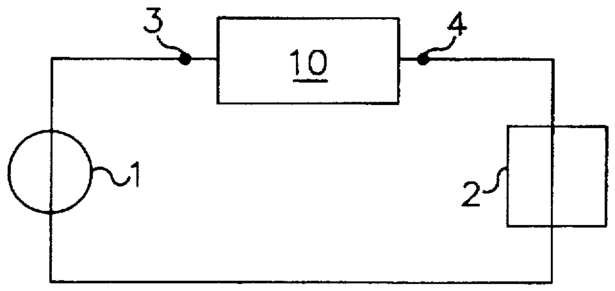
FIG. 1 is a simplified block diagram of the current interrupter.

Referring to FIG. 1, a power source 1 is connected to a load 2 through current interrupter 10. Interrupter 10 has an input terminal 3 connected to source 1 and an output terminal 4 connected to load 2. Interrupter 10 performs the function of providing or interrupting the path for current from source 1 to load 2.

Figure 2:
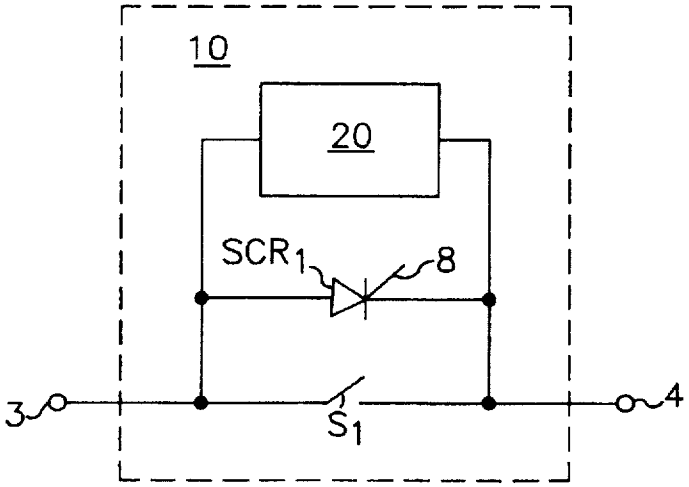
FIG. 2 is a diagram of the current interrupter showing the switch and the SCR and a block diagram of the commutation circuit.

Interrupter 10 is illustrated in FIG. 2. Mechanical switch $S_1$ is connected in series between source 1 and load 2. A high power silicon controlled rectifier (SCR) $SCR_1$ is connected in parallel across switch $S_1$. A commutation circuit 20, for turning off $SCR_1$ by diverting its current, is connected between terminals 3 and 4.

In operation, switch $S_1$, provides a path for continuous current between terminals 3 and 4. To interrupt a current through switch $S_1$, $SCR_1$ is turned on by a current pulse applied to its gate 8 by a gate circuit (not shown). Then switch $S_1$ is opened. When the switch opens, current from terminal 3 to terminal 4 is diverted through $SCR_1$ which has a forward voltage sufficiently small to prevent arcing or ionization between the contacts of the switch. After the switch contacts have separated sufficiently to block the voltage between terminals 3 and 4, commutation circuit 20 momentarily diverts the current, from terminal 3 to terminal 4, away from $SCR_1$ allowing $SCR_1$ to turn off. $SCR_1$ turns off when its current is reduced to zero. This can be viewed either as momentarily diverting the $SCR_1$ current through the commutation circuit or as the superposition of a current pulse, provided by the commutation circuit, of equal magnitude and opposite direction onto the $SCR_1$ current. This completes the interruption sequence.

To initiate a current from terminal 3 to terminal 4 when switch $S_1$ is open, $SCR_1$ is turned on by applying a current pulse to gate 8 to initiate the current and then switch $S_1$ is closed. $SCR_1$ turns off automatically when its current is diverted through the switch. However, $SCR_1$ can be held on temporarily by current applied to gate 8 if necessary to bridge across contact bounce in switch $S_1$.

Figure 3:
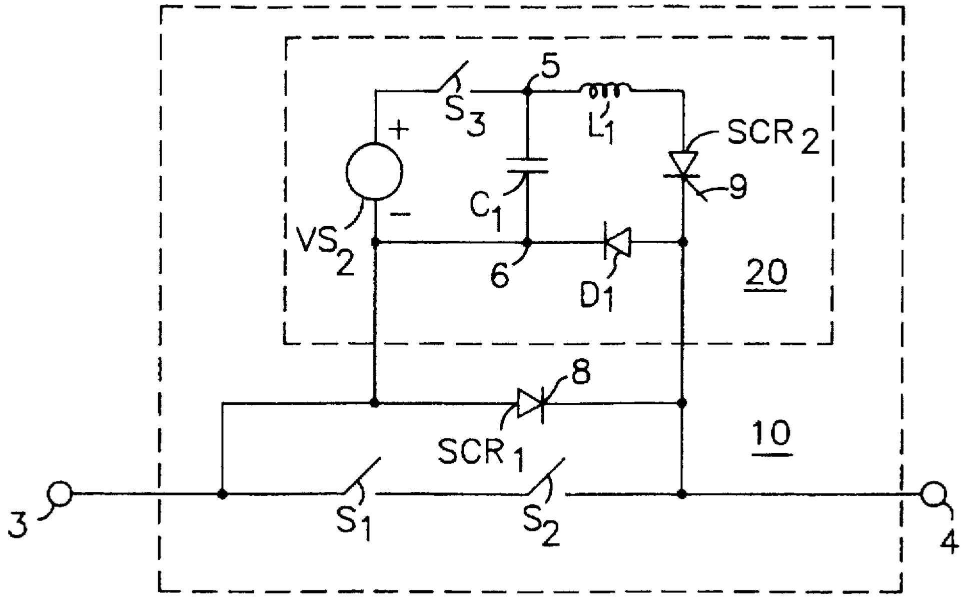
FIG. 3 is a schematic diagram of a preferred embodiment of the current interrupter.

FIG. 3 shows a preferred embodiment of interrupter 10. Switch $S_2$ is connected in series with switch $S_1$ between terminals 3 and 4. Commutation circuit 20 comprises isolated dc power supply $VS_2$, switch $S_3$, capacitor $C_1$, diode $D_1$, inductor $L_1$, and $SCR_2$. Power supply $VS_2$ is connected across capacitor. $C_1$ through switch $S_3$. The anode of $SCR_2$ is connected via node 5 to capacitor $C_1$ through inductor $L_1$. The cathode of $SCR_2$ is connected to the anode of diode $D_1$ and to terminal 4. The cathode of diode $D_1$ is connected via node 6 to capacitor $C_1$ and to terminal 3. Inductor $L_1$ and capacitor $C_1$ comprise a resonant circuit for providing the bypass current to turn off $SCR_1$.

A current interruption sequence is initiated by providing a current pulse from a gate circuit (not shown) to the gate 8 of $SCR_1$. Then switch $S_1$ opens which diverts the high current through $SCR_1$. The forward voltage drop across $SCR_1$ is less than five volts which permits $S_1$ to interrupt the high current through the switches with minimal arcing between its contacts. Then switch $S_2$ opens, after $S_1$ has interrupted the current through the switches, to provide a high voltage blocking capability if liquid metal wetted contacts are used for switch $S_1$. If $S_1$ is a vacuum switch, $S_2$ is optional and would only be used to provide a redundant fail safe capability. After both switches $S_1$ and $S_2$ have opened, $SCR_1$ is turned off by commutation circuit 20 and the circuit is left with $SCR_1$ and $SCR_2$ turned off, $S_1$ and $S_2$ open and the source voltage blocked from the load.

The complete sequence of operation for interrupting load current is as follows:

(1) A charge is placed on capacitor $C_1$ from isolated supply $VS_2$; then supply $VS_2$ is disconnected from $C_1$ by switch $S_3$ before the interruption sequence is initiated. $SCR_1$ and $SCR_2$ are in a non-conducting state.

(2) A current pulse is applied to the gate 8 of $SCR_1$ to place $SCR_1$ in a ready-to-conduct state.

(3) Switch $S_1$ is opened to interrupt the load current through $S_1$ and $S_2$, thereby diverting the current from terminal 3 through $SCR_1$ to terminal 4.

(4) After the current through $S_1$ is interrupted and is transferred to $SCR_1$, $S_2$ is opened.

(5) $SCR_2$ is turned on by a current pulse, applied to gate 9 from a gate circuit (not shown), to cause an oscillatory current, driven by the charge on $C_1$, through $C_1$, $L_1$, $SCR_2$, load 2, and source 1 back to $C_1$. This causes an increase in the voltage at the cathode (terminal 4) of $SCR_1$ and reduces the current through $SCR_1$ to zero.

(6) When the current in $SCR_1$ is reduced to zero, $SCR_1$ turns off and the excess current through $SCR_2$ continues from $C_1$ through $L_1$, $SCR_2$ and $D_1$ back to $C_1$.

(7) After a half cycle of current through the series resonant circuit $C_1$ and $L_1$, the charge on $C_1$ has reversed and the current tries to reverse but is blocked by diode $D_1$ and $SCR_1$, which has turned off.

(8) Inductance in source 1, load 2 or in the lines between source 1 and load 2, will force current to continue through $C_1$, $L_1$, $SCR_2$, load 2 and source 1 until the energy in the inductance is either dissipated or transferred to $C_1$ .

(9) The voltage across $C_1$ will continue to go more negative as current is forced through it by the source, load and line inductance. As the negative voltage on $C_1$ increases, the current through it decreases until the current through $C_1$, $L_1$ and $SCR_2$ reaches zero and $SCR_2$ is reverse biased and turns off.

(10) At the end of the sequence, all switches are open and all SCRs are off.

The complete sequence for closing the switch is:

(1) $SCR_1$ is turned on.

(2) After current is established in $SCR_1$, $S_2$ is closed and then $S_1$ is closed.

(3) When switches $S_1$ and $S_2$ are closed, the voltage across $SCR_1$ is reduced to near zero and $SCR_1$ turns off.

To ensure turn-off of $SCR_1$, the resonant frequency of the $C_1$ and $L_1$ circuit of FIG. 3 must be low enough to maintain current through $D_1$ until the rated maximum turn off time of $SCR_1$ is exceeded. Also, the minimum peak current obtainable from the $C_1$, $L_1$ resonant circuit must be greater than the maximum load current through $SCR_1$.

Also in FIG. 3, the isolated charging supply $VS_2$ for $C_1$ is disconnected from $C_1$ by $S_3$ before the commutation sequence begins to ensure that $SCR_2$ will not remain turned on due to current from the supply. Although shown in FIG.

3 as a simple switch, the function of switch $S_3$ can be accomplished by a solid state switch or in some circuit applications a resistor in place of the switch.

Figure 4:
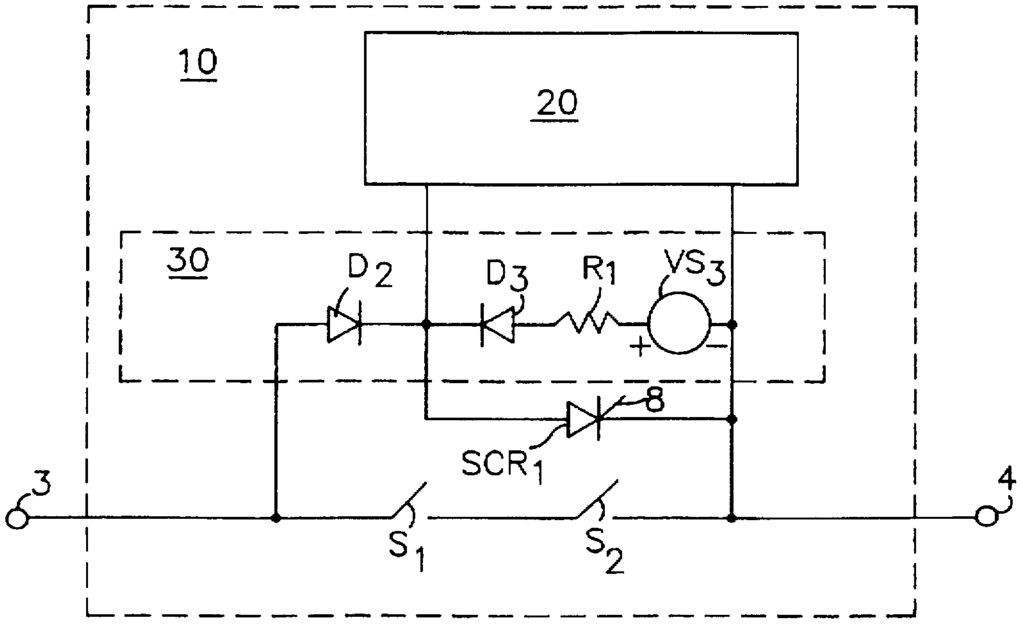
FIG. 4 is a schematic diagram of the current interrupter showing circuitry added to obtain a high di/dt capability.

In some external circuits, $SCR_1$ may be required to turn on into high di/dt (rate of change of current) conditions. Although SCRs have recently been developed that have di/dt ratings of 20 kilo amperes (KA) per microsecond and 150 KA peak current, fast switching SCRs can be combined with auxiliary circuitry to achieve even higher di/dt capability. FIG. 4 shows an optional standby circuit 30 used to obtain higher di/dt capability. A rectifier $D_2$, a diode $D_3$, a low voltage dc supply $VS_3$, and a current limiting resistor $R_1$ are added to the circuit previously described in FIG. 3. Rectifier $D_2$ is inserted between terminal 3 and the junction of the anode of $SCR_1$ and commutation circuit 20. The low voltage supply $VS_3$, diode $D_3$ and resistor $R_1$ are connected in series and the combination is connected across $SCR_1$. Note that the low voltage supply $VS_3$ and resistor $R_1$ comprise a simple standby current source, which could be implemented in other ways.

In operation, $SCR_1$ is turned on when a current pulse is applied to its gate 8. This provides a standby current path from the positive side power supply $VS_3$ through resistor $R_1$, diode $D_3$, $SCR_1$ and back to the negative side power supply $VS_3$. With this standby circuit, $SCR_1$ can be turned on even if switches $S_1$ and $S_2$ are closed because rectifier $D_2$ blocks the current path through the switches. After $SCR_1$ is turned on and the standby current is established, $SCR_1$ can be subjected to high di/dt without damage.

Figure 5:
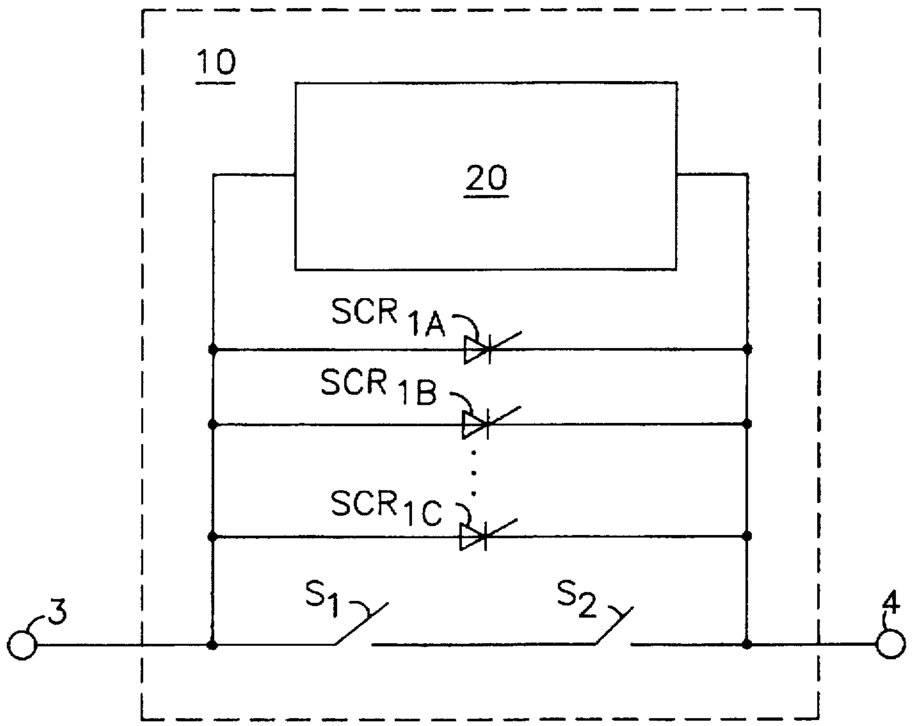
FIG. 5 is a modification of FIG. 2 showing multiple parallel SCRs.

Several SCRs can be paralleled in the $SCR_1$ location, as shown in FIG. 5, to reduce the individual SCR currents. This may be necessary to limit the on-state voltage to avoid exceeding the ionization voltage of the switches or to limit the power dissipation in the SCRs.

Figure 6:
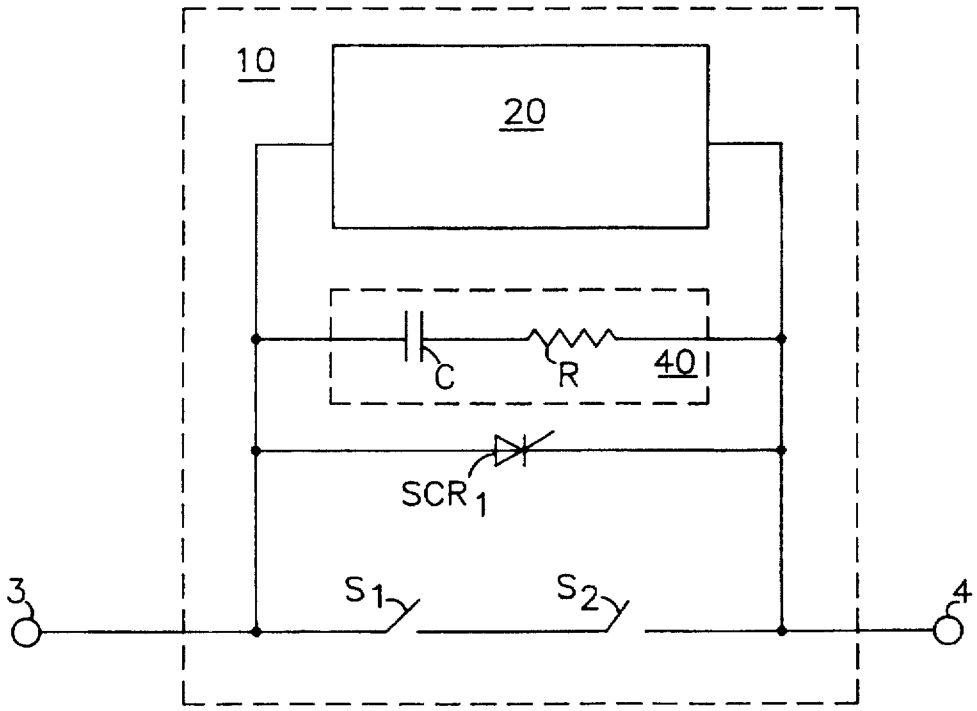
FIG. 6 is a modification of FIG. 2 showing the addition of a snubber circuit.

When the voltage on capacitor $C_1$ of FIG. 3 is reversed and diode $D_1$ switches from conduction to reverse blocking, the voltage across $SCR_1$ appears as a fast rising forward blocking voltage. The rate of change of the voltage (dv/dt) must be less than the rating of the SCR. If necessary, this rate of change can be limited by placing a common snubber circuit 40 across $SCR_1$ as shown in FIG. 6. Although shown as a simple resistor R and capacitor C circuit, snubber circuits can have many forms, as known to one of ordinary skill in the art.

Figure 7:
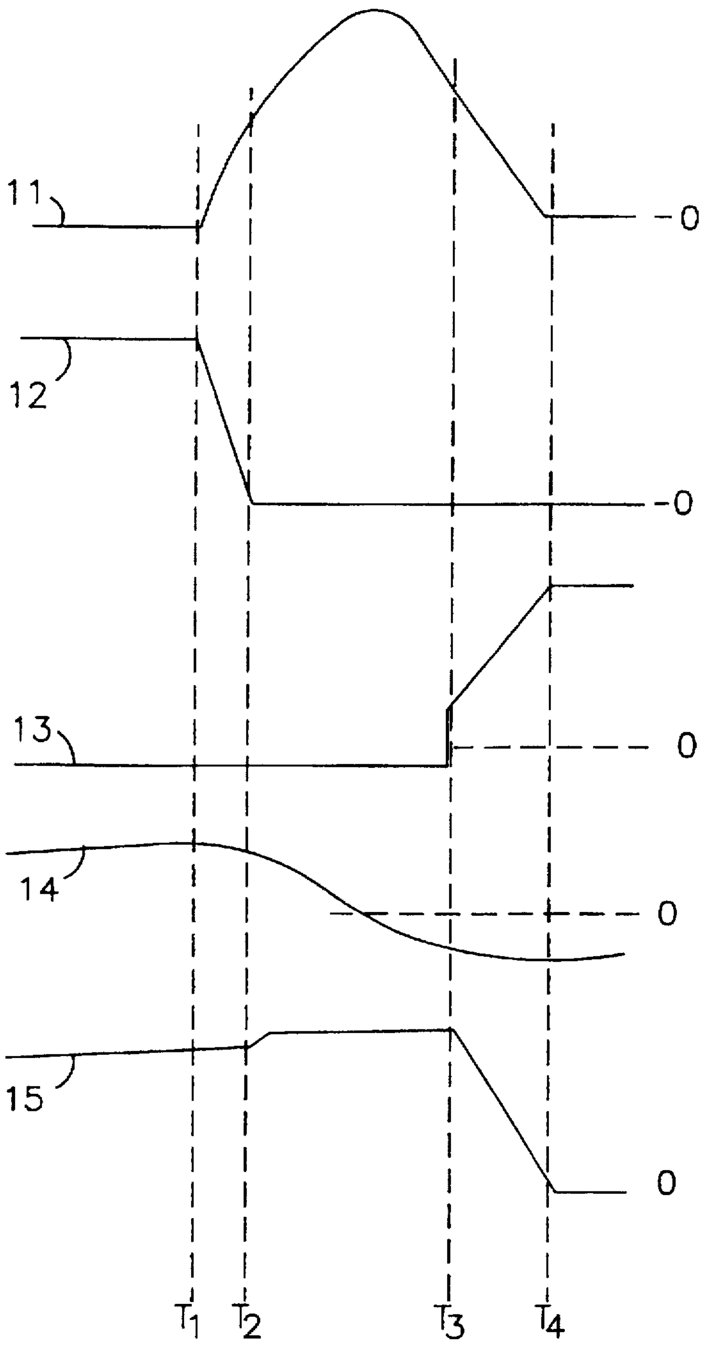
FIG. 7 shows waveforms for the commutation circuit turn-off sequence.

FIG. 7 shows commutation waveforms and presents a description of the turn off sequence for commutation circuit 20 shown in Fig. 3. Waveforms 11 and 12 represent the currents through $SCR_2$ and $SCR_1$, respectively. Waveforms 13, 14 and 15 represent the voltages across $SCR_1$, $C_1$ and load 2, respectively. $SCR_2$ is turned on at time $T_1$. The current in SCR, is forced to zero at time $T_2$.

The voltage across $D_1$ is reversed at time $T_3$ causing the voltage across $SCR_1$ to increase. At time $T_4$ the current in $SCR_2$ goes to zero and the voltage across load 2 is removed.

While the invention has been described above with respect to specific embodiments, it will be understood by those of ordinary skill in the art that various changes in form and details may be made therein without departing from the spirit and scope of the invention. For example, although the term SCR (silicon controlled rectifier) has been used throughout the preceding description, other types of thyristors (bistable semiconductor switches) may be used in place of the SCRs. Because the commutating circuit turns off a thyristor by reducing its current to zero, a given thyristor can handle much higher currents when commutated than when a device itself interrupts the current.

We claim:

1. An electrical current interrupter for interrupting a high current in a conductor, comprising:

a mechanical switch, connectable in series with the conductor;

a first thyristor connected in parallel with said mechanical switch, said first thyristor for bypassing the high current while said mechanical switch opens; and a commutation circuit connected in parallel with said first thyristor in order to minimize the voltage across contacts of said switch when said current transfers to said first thyristor and said commutation circuit, said commutation circuit for turning off said first thyristor;

wherein said commutation circuit includes a resonant circuit connected in parallel with said first thyristor and a diode connected in parallel with said first thyristor; and wherein said resonant circuit includes a capacitor, an inductor, and a second thyristor connected in series with each other.

2. The current interrupter of claim 1 wherein said commutation circuit further includes a power supply connectable to said capacitor for charging said capacitor.

3. The current interrupter of claim 2 wherein said first thyristor comprises a plurality of thyristors connected in parallel.

4. The current interrupter of claim 2 further including a standby circuit for supplying current to said first thyristor while said mechanical switch is closed, wherein said standby circuit includes a rectifier, said rectifier connected in series with the parallel combination of said first thyristor and said commutation circuit, and a current source and a diode connected in a series string, said series string connected in parallel with said first thyristor.

5. The current interrupter of claim 1 further including a standby circuit for supplying current to said first thyristor while said mechanical switch is closed, wherein said standby circuit includes a rectifier, said rectifier connected in series with the parallel combination of said first thyristor and said commutation circuit, and a current source and a diode connected in a series string, said series string connected in parallel with said first thyristor.

6. The current interrupter of claim 5 wherein said first thyristor comprises a plurality of thyristors connected in parallel.

7. The current interrupter of claim 1 wherein said first thyristor comprises a plurality of thyristors connected in parallel.

8. The current interrupter of claim 1 further comprising a snubber circuit connected in parallel with said first thyristor for limiting the rate of change of voltage (dv/dt) across said first thyristor.

9. The current interrupter of claim 1 wherein said mechanical switch comprises a first switch and a second switch connected in series.

10. The current interrupter of claim 1 wherein said mechanical switch has liquid metal wetted contacts.

11. The current interrupter of claim 1 wherein said mechanical switch is a vacuum switch.

12. An electrical current interrupter for interrupting a high current in a conductor, comprising:

a mechanical switch, connectable in series with the conductor;

a first thyristor connected in parallel with said mechanical switch, said first thyristor for bypassing the high current while said mechanical switch opens;

a commutation circuit connected in parallel with said first thyristor in order to minimize the voltage across contacts of said switch when said current transfers to said first thyristor and said commutation circuit, said commutation circuit for turning off said first thyristor, comprising:

a resonant circuit and a diode, each connected in parallel with said first thyristor, wherein said resonant circuit includes a capacitor, an inductor, and a second thyristor connected in series, and wherein said resonant circuit further includes a power source connectable to said capacitor for charging said capacitor;

a standby circuit for supplying current to said first thyristor when said mechanical switch is closed, said standby circuit comprising:

a rectifier, said rectifier connected in series with the parallel combination of said first thyristor and said commutation circuit, and a current source and a diode connected in a series string, said series string connected in parallel with said first thyristor; and a snubber circuit, connected in parallel with said first thyristor, for limiting the rate of change of voltage (dv/dt) across said first thyristor.

13. The current interrupter of claim 12 wherein said first thyristor comprises a plurality of thyristors connected in parallel.

* * * * *